(12) United States Patent
Noll et al.

(10) Patent No.: US 6,282,824 B1
(45) Date of Patent: Sep. 4, 2001

(54) DISPLAY DEVICE

(75) Inventors: Barbara Noll, Serzingen; Helmut Nahrgang, Allensbach, both of (DE)

(73) Assignee: Evobus GmbH Corporation, Stuttgart (DE)

( * ) Notice: Subject to any disclaimer, the term of this patent is extended or adjusted under 35 U.S.C. 154(b) by 0 days.

(21) Appl. No.: 09/085,123

(22) Filed: May 27, 1998

(30) Foreign Application Priority Data

May 30, 1997 (DE) .............................................. 197 22 682

(51) Int. Cl.[7] ...................................................... G09F 7/12
(52) U.S. Cl. ............................. 40/594; 40/593; 40/447; 40/452
(58) Field of Search .............................. 40/591, 592, 593, 40/594, 589, 451, 452, 447; 345/55, 59; 340/815.53, 815.62

(56) References Cited

U.S. PATENT DOCUMENTS

| | | | |
|---|---|---|---|
| 1,347,012 | 7/1920 | Colony | 40/589 X |
| 1,782,883 | 11/1930 | Rosenfield | 40/591 |
| 2,802,282 | 8/1957 | Bader | 40/591 |
| 4,003,149 | 1/1977 | De Vries | 40/447 X |
| 4,064,502 | 12/1977 | Saylor et al. | 40/447 X |
| 4,449,167 | 5/1984 | Cohen | 40/593 X |
| 4,627,182 | 12/1986 | Weiss | 40/447 |
| 5,241,768 | 9/1993 | Thompson | 40/593 X |
| 5,771,616 | 6/1998 | Tijanic | 40/452 |
| 5,943,802 | * 8/1999 | Tijanic | 40/591 |

* cited by examiner

*Primary Examiner*—Terry Lee Melius
*Assistant Examiner*—James M Hewitt
(74) *Attorney, Agent, or Firm*—Richard G. Lione; Brinks Hofer Gilson & Lione

(57) ABSTRACT

A display device, in particular in a motor bus, has at least one display field and fasteners for releasably securing the display field in the motor bus. An observation window is arranged at least between the display field and a viewer. In order to make the fastening of the display device less complicated and less expensive and in order to reduce the weight, the dimensions and the costs of the display device at the same time, the fasteners are releasably secured directly to the inner side of the observation window, the inner side facing away from the viewer.

9 Claims, 5 Drawing Sheets

DISPLAY DEVICE

BACKGROUND OF THE INVENTION

The present invention refers to a display device, in particular in a motor bus, comprising at least one fastening means for releasably securing a display field, an observation window being arranged at least between said display field and a viewer.

Such display devices are known in practice as destination indications from vehicles used for public transport, such as trams and motor buses. According to the regulations, such display means are to be arranged in the forward part, on both sides and in the rear part of the respective vehicle. The destination indications may indicate the destination of the vehicle as well as a number associated with this specific line of the public transport means.

The display devices are normally arranged with the aid of a fastening means directly on frame members of the respective vehicle and in the roof area of the vehicle. Such display devices arranged in the roof area are normally not visible from the passenger compartment. Due to the size of the display device, a comparatively large amount of space is, however, required in the roof area, whereby less space will be available e.g. for the passenger compartment. If these known display devices are suspended directly in the passenger compartment with the aid of their fastening means, they constitute a source of danger for passengers, the resultant risk of injuries being too high to be neglected. Furthermore, the known display devices are comparatively voluminous and heavy so that the fastening means must have a sufficiently stable structural design and so that sufficient space for installing said display devices must be available in the vehicle.

A further disadvantage of known display devices is that the actual display field is covered by means of a separate observation window so that irritating reflections, which may impair the legibility of the display, may occur between this observation window and a further window covering the display device in th e vehicle towards the outside.

It is therefore the object of the present invention to improve the known display device in such a way that this display device will have smaller dimensions and less weight and that it can also be produced and installed at a moderate price and read more easily.

SUMMARY OF THE INVENTION

On the basis of the known display device, this object is achieved in that the fastening means is releasably secured directly to the inner side of the observation window, said inner side facing away from the viewer. The display device is thus held directly by the observation window. Neither a separate fastening by means of screws nor any other kind of fastening to the frame members of the vehicle is required. This makes the display device in its entirety lighter and smaller. Since the display device can in this way be arranged such that its display field extends at a small distance from the observation window, the display device will have a small depth so that less space will be required for installing it e.g. in the roof area of the vehicle or that it will project substantially less far into the passenger compartment.

In this connection, it must also be considered to be advantageous when the observation window is formed by a window-like glazing. This has the effect that a separate observation window for the display field, which would have a negative influence on the legibility of the display, can be dispensed with, and the display device in its entirety is attached directly to a glazing provided in the vehicle.

The windowlike glazing can in this connection be part of a front glazing or rear glazing or side glazing in a motor bus or in some other vehicle. The display device is in this way attached directly to the windows existing in the vehicle anyhow, without restricting e.g. the field of vision of a passenger or a driver, since the display device is normally arranged at the upper end of the windows.

Yet another advantage can be attained when the display device and the associated glazing are arranged above and in spaced relationship with a front glazing or a rear glazing or a side glazing in the vehicle. This applies especially to display devices which are arranged in the roof area and separately from the actual passenger compartment. However, as has already been stated hereinbefore, the space required for installing the display device is comparatively small, due to the fact that the display device is attached directly to the inner side of the glazing; this will be of advantage especially in the case of vehicles of the low-floor type, which always require more space in the roof area.

Due to the smaller spaces required for installing the device according to the present invention, costs will be saved, since the space saved can, for example, be used in some other way or since a respective covering of the mounting space will have smaller dimensions.

According to a preferred embodiment, the fastening means can be fixed directly to the inner side of the glazing by means of an adhesive. Another releasable fastening for the fastening means can be effected by screw-fastening or the like.

For fastening the display field and, consequently, the display device in its entirety to the glazing in a comparatively stable manner, the fastening means can be formed by fastening rails extending at least partially along the display field. These fastening rails can have secured thereto the display field directly or indirectly by pushing on, by screw fastening, by a locking engagement or the like.

In the case of the normally used, substantially rectangular display fields, it proved to be sufficient when the fastening rails extend at least along the longitudinal sides of the display field. The display field can, for example, be pushed onto the fastening rail in the longitudinal direction of said fastening rail by means of sliding guides formed on said display field.

In order to protect the display field against damage and soiling as far as possible, the display device may be provided with a covering which covers the display field at least on its back that faces away from the glazing. This will be advantageous especially in the case of display devices arranged in the passenger compartment, since a possible risk of injuries as well as damage which may be caused to the display field when a passenger touches said display field are largely excluded in this way.

A simple covering is formed in that said covering comprises a frame member and a rear cover which are releasably fixed to one another and which hold an edge flange that surrounds the display field at least partially. The frame member and the rear cover can be implemented such that the frame member surrounds the display field essentially as a border and is secured thereto, the rear cover being adapted to be secured directly to the frame member and/or the display field.

In accordance with a simple embodiment, the edge flange can extend along the longitudinal sides of the display field and the frame member can be formed by two flat profiles which abut on the edge flange on one side thereof, the edge flange being arranged between said flat profiles and respective contact surfaces or contact projections formed on said rear cover and being held therebetween in that said cover and said flat profiles are releasably fastened, especially by means of screws. A recess for positively or non-positively receiving therein at least a part of the edge flange can be formed between said flat profiles and said contact surfaces.

For holding the edge flange not only in a recess between the cover and the flat profiles, the edge flanges can be provided with holes and/or recesses for receiving therein screws for releasably fastening the cover, the edge flange and the flat profiles. In this case, a flat profile is arranged on one side of the edge flange and this flat profile is secured to the cover, especially in the area of the contact surfaces, by means of the screws passed through the holes and/or recesses in the edge flange.

A cover having small dimensions by means of which the depth of the display device is reduced still further has substantially the shape of a flat cover shell, a shell bottom covering the rear of the display field and shell walls projecting from said shell bottom in the direction of the glazing surrounding the display field preferably on all sides thereof.

In order to protect the display field against soiling and against damage which may be caused e.g. by moisture or by touching, the free ends of the shell walls can sealingly abut on the inner side of the observation window or glazing, when the display field is releasably secured to the fastening means.

In order to facilitate handling of the display field and in order to protect said display field at the same time, the display field and the covering can define a premountable constructional unit.

In order to permit a stable fastening of the display field to the fastening means, the display field and/or the covering can releasably be connected to the fastening rails in the area of the edge flange and of the flat profiles, respectively. This can be done e.g. by screws inserted from the back of the covering, said screws passing through the edge flange and the flat profiles and being screwed into the fastening rail.

In the most simple case, the fastening rails have a substantially T-shaped cross-section, the T-crossbar being fixed to the inner side of the glazing by means of an adhesive, and the T-base having releasably secured thereto the display field and/or the covering. The whole surface of the T-cross-bar can be used as an adhesive surface. The T-base can have an enlarged bas e area having formed therein a screwing-in opening used for receiving therein a fastening screw.

A masking layer can be applied, especially by means of screen printing, to the inner side of the glazing at least in the area of the glued-on T-crossbars e.g. for emphasizing the display field by a frame on the glazing and for covering at the same time the glueing points between the holding rails and the inner side of the glazing which may perhaps be unsightly or which may negatively influence the overall appearance in some other way.

In the case of a simple embodiment, a roll tape can be guided along the display field, said roll tape being adapted to be unreeled mechanically by means of two rotatable reels arranged at the ends of the display field. The display field preferably used is, however, a display field comprising a plurality of individual display elements which are adapted to be activated individually. These display elements are arranged e.g. in a matrixlike arrangement and, depending on the individual display elements activated, different displays are realized. The display can also be presented to the viewer in the for m of a running text or the like.

Such an individual display element can, for example, be a comparatively economy-priced, electromagnetically activable, disk-shaped, rotatably supported, two-coloured individual display element. Depending on the rotational position of the disk, the individual display element is activated or deactivated.

When such display fields, which are composed of electromagnetically activable individual display elements and which are known per se, are used, additional illumination by a tubular fluorescent lamp is normally provided, said tubular fluorescent lamp illuminating the normally reflecting display side of the individual display element more effectively in particular when it is dark or when the sun shines.

A space-saving and economy-priced alternative to illumination by a tubular fluorescent lamp can be obtained by associating with each individual display element a light-emitting diode (LED) for illuminating the display side of the individual display element. The current demand of such light-emitting diodes is, for example, lower than that of a comparable tubular fluorescent lamp.

For controlling and programming the display devices and especially the display fields, a display control can be arranged e.g. in the display device, said display control being connected to a bus system arranged in the vehicle. The display device can be controlled e.g. from the driver's seat via the bus system, and various programs for various displays stored in said display control or centrally in a suitable electronic system at the driver's seat can be called.

When the display device described hereinbefore is used, it is, of course, also possible to provide one or more of the display devices arranged in a vehicle of the short-distance or regional public transport system with a display field which can be seen from outside the vehicle and from the passenger compartment. These display fields can abut on one another e.g. via their rear surfaces, the covering in question having provided therein an opening through which the display field facing the passenger compartment is visible. The opening can be covered by a suitable observation window.

The display device can be provided with an alphanumerical and/or a numerical display. In addition, it can be possible to display certain pictographs, such as a pictograph for "no smoking" or the like.

Furthermore, the display device according to the present invention can also be used outside of vehicles for indicating destinations or the like, e.g. in railway stations, airports and at stops.

In the following, advantageous further embodiments of the present invention will be explained and described in detail on the basis of the figures comprised in the drawing enclosed.

BRIEF DESCRIPTION OF THE DRAWINGS

FIG. 5 show s an enlarged representation of detail "X" of FIG. 4, and

DETAILED DESCRIPTION OF THE INVENTION

Figure 1:
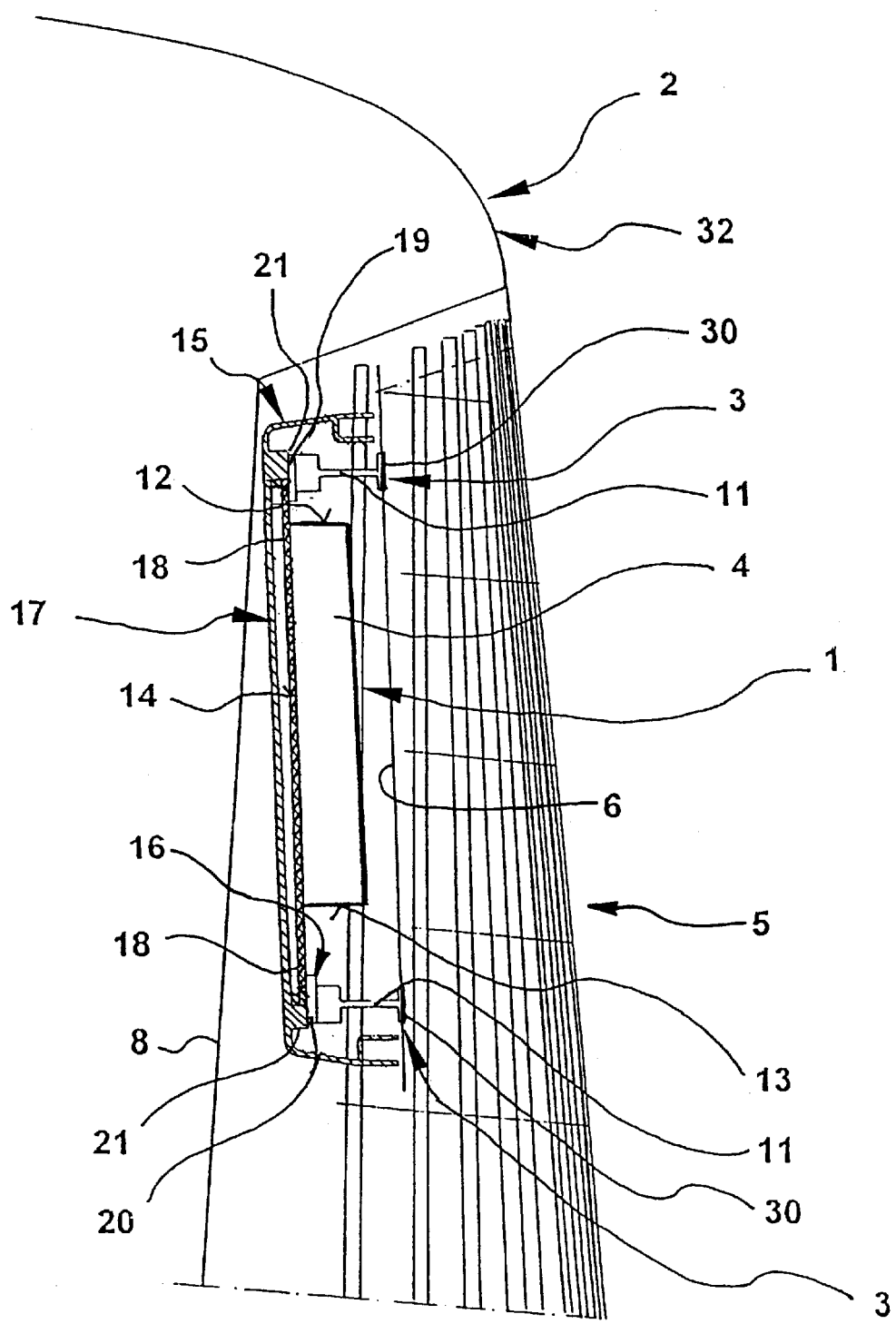
FIG. 1 shows a schematic representation of a display device according to the present invention, which is secured to a front glazing of a partially shown motor bus.

In the following FIGS. 1 to 4, a respective display device according to the present invention is arranged at different locations within a partially shown motor bus. The respective display device is shown in a side view, part of which is a sectional view. Identical reference numerals identify identical parts and apply to all display devices according to FIGS. 1 to 4.

The display device 1 comprises a fastening means 3, a display field 4 and a covering 15. The display field 4 has a substantially rectangular shape, cf. FIG. 6, and extends transversely to the respective observation window 5 and glazing 7, respectively, to the inner side 6 of which it is releasably secured with the aid of the associated fastening means 3.

The display field 4 is visible through the glazing 7 so that alphanumerical or other displays represented by means of the display field can be read by a viewer outside of the vehicle.

Figure 2:
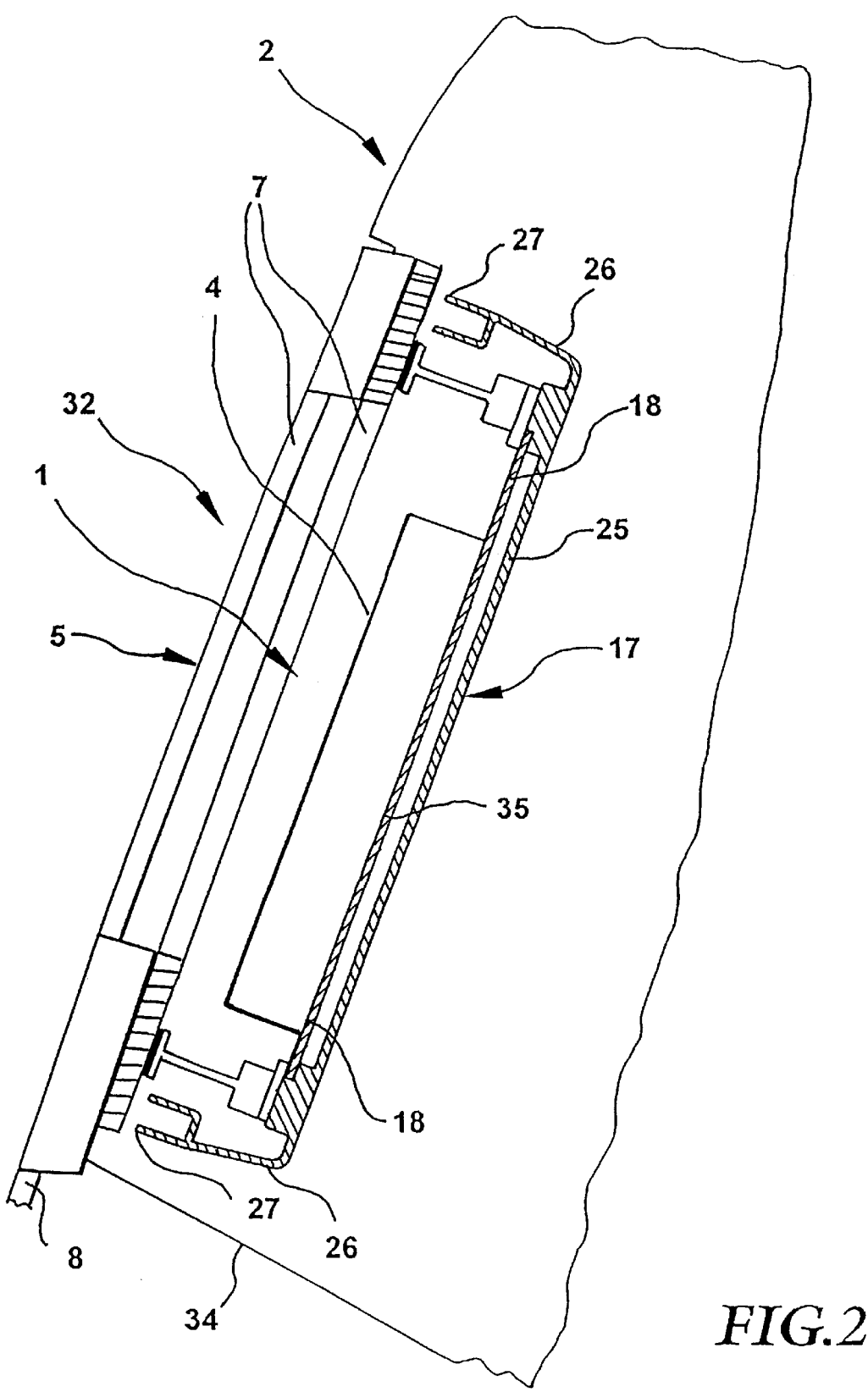
FIG. 2 shows a schematic representation of a display device, which is arranged in the roof area of a partially shown motor bus.
Figure 3:
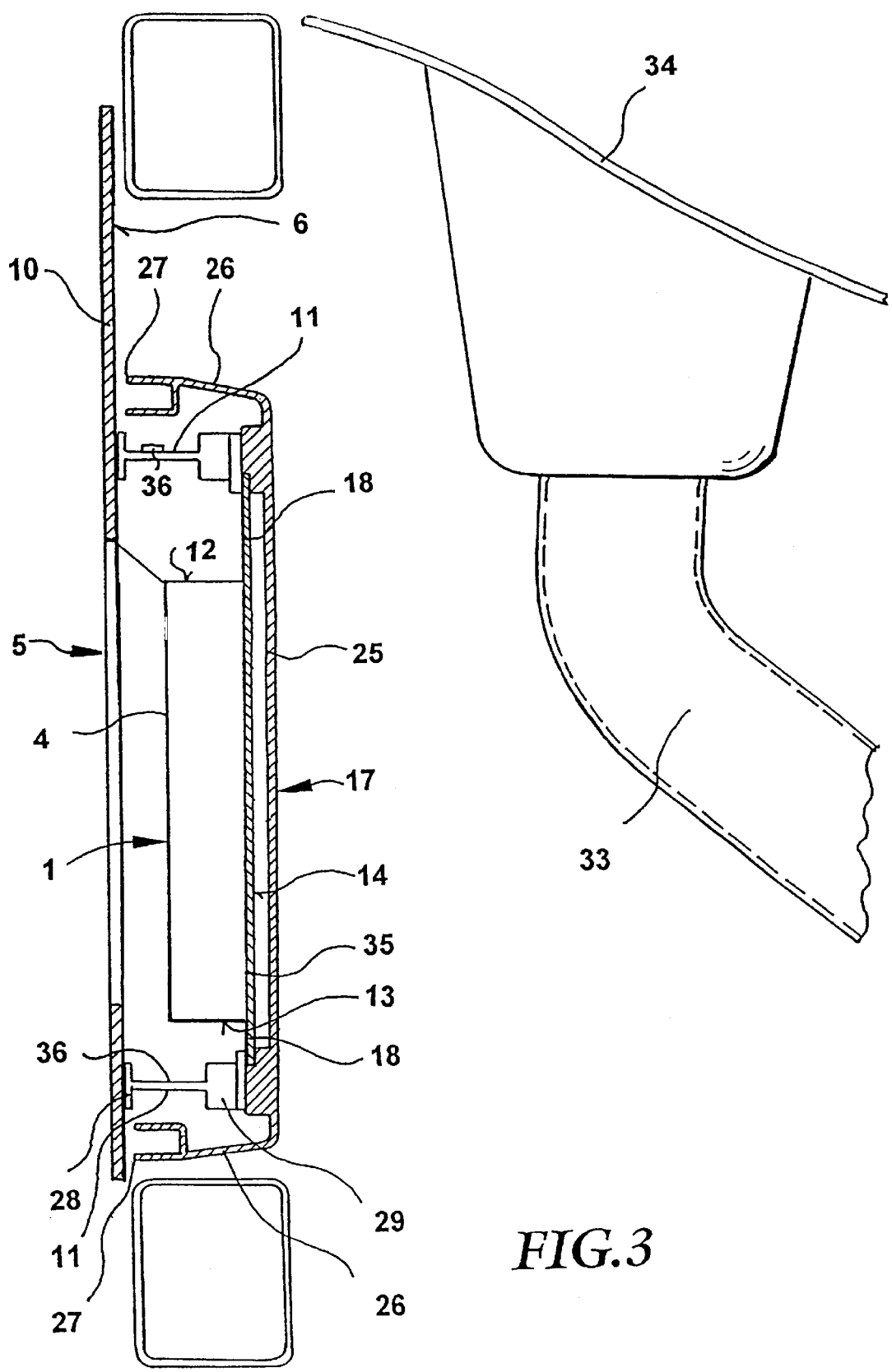
FIG. 3 shows a schematic representation of a display device, which is arranged on a side glazing of a partially shown motor bus.
Figure 4:
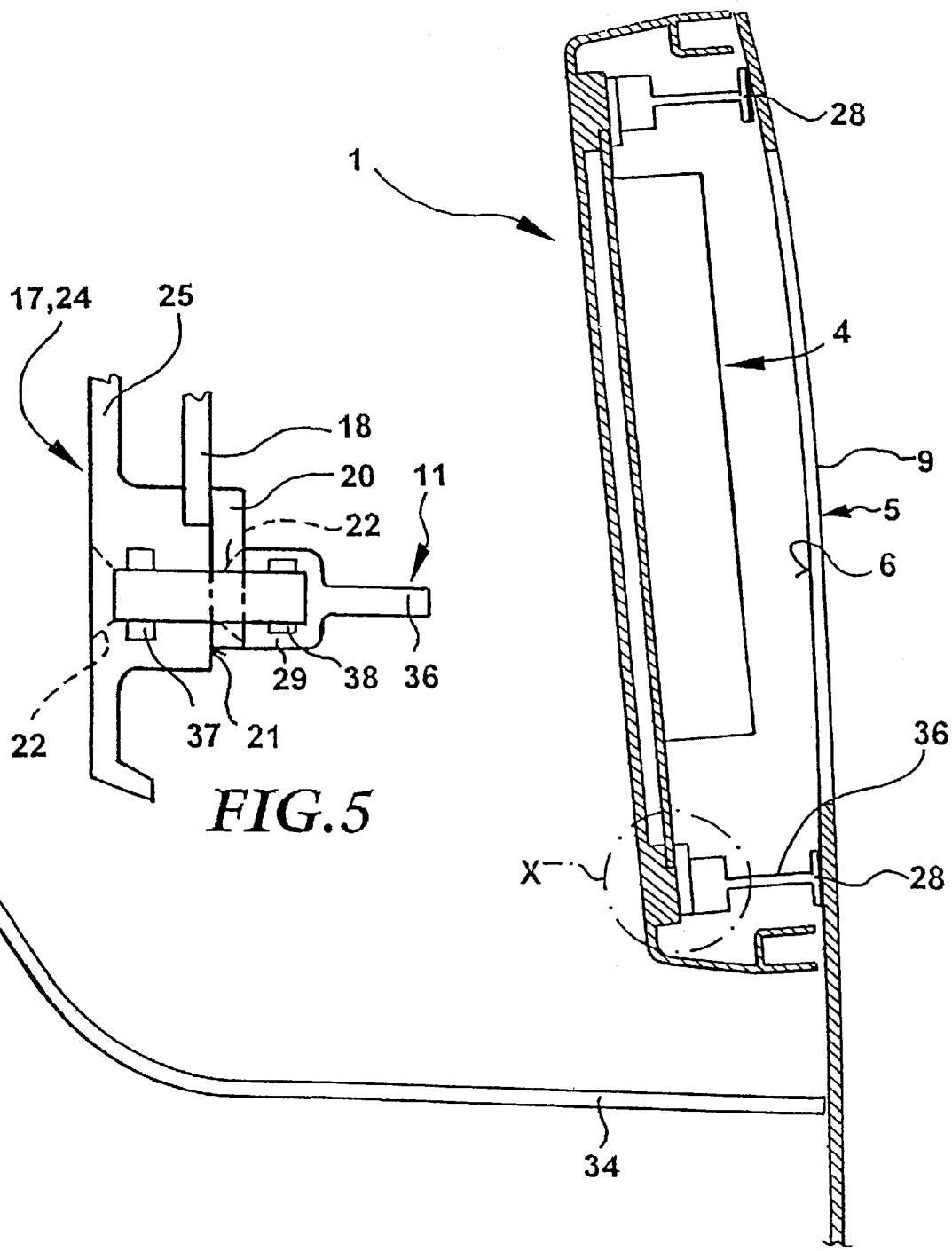
FIG. 4 shows a schematic representation of a display device, which is arranged on a rear glazing of a partially shown motor bus.

In FIG. 1 the display device 1 is secured to the inner side 6 of a front glazing 8, in FIG. 2 to the inner side of a double glazing 7 in a roof area 32 of a motor bus 2, in FIG. 3 to the inner side of a side glazing 10 and in FIG. 4 to the inner side of a rear glazing 9.

With regard to FIG. 3, reference is made to the fact that a corresponding display device is arranged in an analogous manner at the opposite side glazing in the direction of travel.

The display field 4 according to FIG. 1 is secured to the front glazing 8 at the upper end thereof below the roof area 32. Like the display fields of the other figures, the display field 4 according to FIG. 1 is provided with an edge flange 18 projecting upwards and downwards along each of the longitudinal sides 12, 13, cf. also FIG. 6. This edge flange 18 extends essentially along a straight line and can be implemented such that it defines part of a back plate 35, cf. e.g. FIG. 2. This back plate 35 serves as a rear carrier of the display field 4.

The edge flanges 18 are inserted into a complementary slot recess in a covering 15. The covering 15 is composed of a frame member 16 and a rear cover 17. The frame member 16 is a bipartite component composed of two flat profiles 19 and 20 extending along the upper and lower longitudinal sides 12, 13 of the display field 4. The upper flat profile 19 abuts on the edge flange 18 at least partially from one side, a complementary contact surface or contact projection 21 abutting on said edge flange 18 from the respective other side on an inner side of the rear cover 17.

Flat profiles 19, 20, edge flanges 18 and rear cover 17 are implemented as a premountable constructional unit. For mounting this constructional unit, screws are screwed into the flat profiles 19, 20, the edge flange 18 and the rear cover 17, said screws being screwed into these components from the side of said flat profiles.

For holding the display field 4 or rather the premounted constructional unit consisting of said display field 4 and the covering 15, additional screws can be screwed from the back of the cover 17 through said cover 17, the edge flange 18 and the flat profiles 19, 20 into the fastening means 3. The fastening means 3 is defined by two fastening rails 11 extending also essentially parallel to and in spaced relationship with the longitudinal sides 12 and 13.

The fastening rails 11 have a T-shaped cross-section, the T-crossbar 28, cf. e.g. FIG. 3 or 4, having its upper surface, which faces the respective glazing 7, 8, 9 or 10, fixed to the inner side 6 of said glazing by means of an adhesive. A T-leg 36, cf. e.g. FIGS. 3 and 4, projects substantially at right angles and centrally from the T-crossbar 28 in the direction of the flat profiles 19, 20 or the edge flange 18. At the free end of the T-leg, a T-base 29 is formed, said T-base having a C-shaped configuration and said C-shape forming a sliding guide which extends parallel to the longitudinal sides 12, 13.

According to another embodiment, the T-base 29 may include at appropriate points thereof blind holes which are open in the direction of the flat profiles 19, 20 and which are adapted to receive therein screws for fastening flat profiles 19, 20, edge flanges 18 and the rear cover 17. Corresponding screws can also be screwed into the C-shaped T-base of the sliding guide, cf. e.g. FIG. 5, or they can be secured to said component in some other way.

For covering the glued surfaces, which are formed by the upper sides of the T-crossbars 28, outwards in the direction of a viewer, a masking layer 30 is applied to the inner side 6 of the respective glazing. This masking layer can be applied e.g. by means of screen printing. The masking layer 30 surrounds the display field 4 at least along the fastening rails 11; to provide a further border for the display field 4, an appropriate masking layer can also be applied parallel to the transverse sides of said display field 4 which interconnect the longitudinal sides.

In FIG. 2, the display device 1 is arranged in the roof area 32 of the motor bus 2 above a suitable roof lining 34, i.e. outside of the passenger compartment. The glazing 7 is in this case a double glazing, the respective front glazing 8 following said double glazing 7, which is arranged in the roof area 32, in spaced relationship therewith.

The rest of the structural design and the arrangement of said display device 1 according to FIG. 2 corresponds to that of FIG. 1.

In FIG. 3, the display device 1 is fixed by means of an adhesive to the inner side 6 at an upper end of the side glazing. On the back of the cover 17 facing the passenger compartment, a hand rail 33, which is partially shown, is arranged in said passenger compartment. This hand rail 33 is secured to a roof lining 34 of the motor bus in the manner known.

In FIG. 2 and 3, a cover shell 17, is marked by means of reference numerals. The cover shell 17 comprises a flat shell bottom 25 and shell walls 26 which project from said shell bottom in the direction of the inner side 6 of the respective glazing 7. These shell walls 26 extend outside of the fastening rails 11 and surround the display field 4 at least along the longitudinal sides 12 and 13 thereof. Free ends 27 of the shell walls 26 are essentially U-shaped in the case of the embodiment shown, a suitable sealing element (not shown), which sealingly abuts on the inner side 6 of the respective glazing, being arranged in the U-shape.

When the shell walls 26 surround the display field 4 completely, the sealing element is implemented as a sealing ring having a substantially rectangular shape.

The display device 1 according to FIG. 4 is arranged on the inner side 6 of the rear glazing 9 above a suitable roof lining 34, i.e. outside of the passenger compartment. In correspondence with the embodiment according to FIG. 2, the display device 1 according to FIG. 4 could also be secured in position above the actual rear glazing on a separate glazing in the roof area.

In the case of all the embodiments of the display device, the masking layer 30 is arranged between the fastening rails 11 and the glazing.

In FIG. 5, a detail "X" of FIG. 4 is shown in an enlarged representation. This detail "X" exists analogously in the display devices according to FIGS. 1 to 3.

In FIG. 5, it can especially be seen that a premountable constructional unit consisting of flat profiles 19, 20, display field 4 with edge flange 18 and rear cover 17 can be produced by means of a screw 22 screwed in from the side of the lower flat profile 20. The screw 22 is screwed into a complementary opening in the flat profile 20 until it has reached a position at which it is flush with said flat profile 20. The screw 22 extends at least up to a fixing thread 37, which is arranged in the contact surface or contact projection 21 and into which said screw can be screwed.

For fastening this premounted constructional unit or also for directly fastening the not yet interconnected flat profiles 19, 20, edge flanges 18 and rear cover 17, additional screws 22 can be screwed in from the shell bottom 25 of the cover 17 through the contact projection 21, the edge flange 18, the flat profiles 19, 20 up to and into the T-base 29 of the fastening rail 11. A suitable fixing thread 38 for screw-fastening with the screws 22 is formed in the T-base 29.

In the case of another fastening possibility of the premounted constructional unit consisting of the flat profiles 19, 20, the display field 4 and the cover 17, said premounted constructional unit can also be displaceably inserted in sliding guides formed in the T-base 29, or it can be lockingly engaged with or screw-fastened to said sliding guides.

Figure 6:
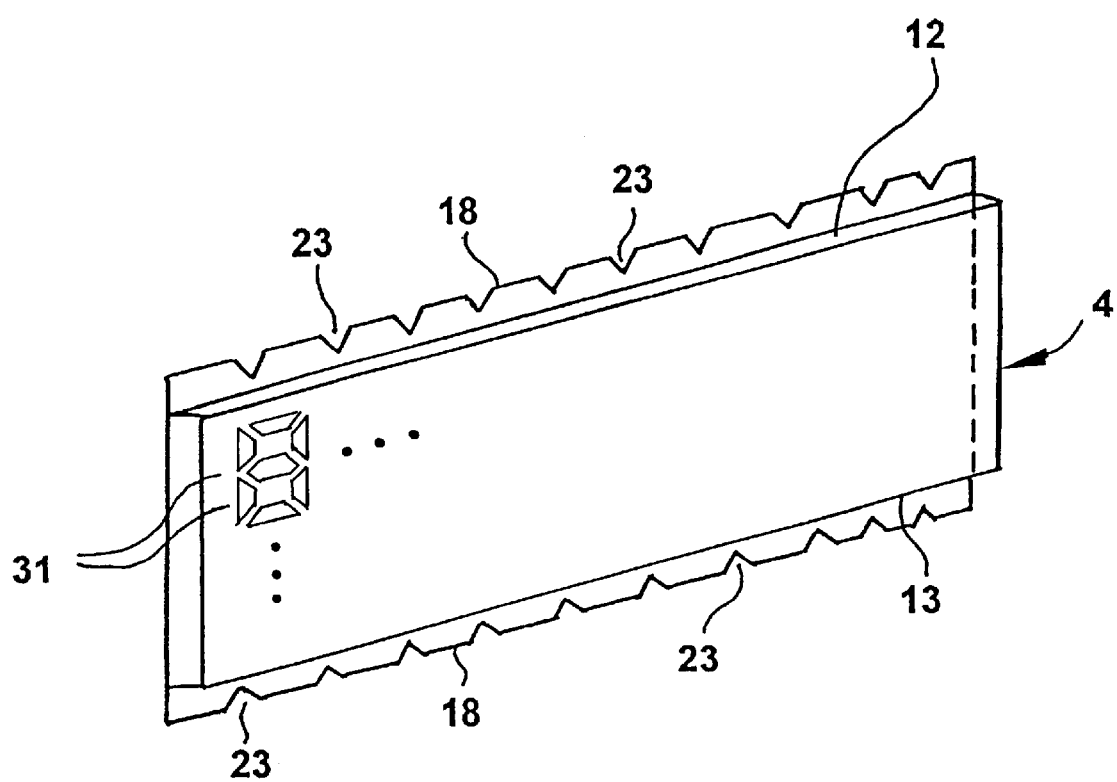
FIG. 6 shows a perspective front view of a display field for use in the display device according to the present invention.

FIG. 6 shows a perspective front view of a display field 4. The edge flanges 18 have arranged therein a series of holes or recesses 23 along the longitudinal sides 12, 13. These holes or recesses 23 serve to receive therein the respective screws 22, cf. FIG. 5 or also FIGS. 1 to 4.

The display field 4 has on its front a plurality of individual display elements 31, said front of the display field facing the inner side of the respective glazing. These display elements are arranged in rows and columns in a matrixlike arrangement and they are adapted to be activated individually by a suitable control or electronic system, not shown. The suitable control or electronic system can be arranged in the display field 4 or at some other point within the display device 1, cf. the preceding figures.

We claim:

1. In a public transport vehicle, the combination of an observation window and a display device wherein:
    a) said window includes an inner side and an outer side; and
    b) said display device includes
        i) a display field having a front face facing said inner side of said window and a back face facing away from said inner side of said window, with a plurality of display elements on said front face, said display field being substantially rectangular and having longitudinal sides,
        ii) a shell including a shell bottom covering said back of said display field and a shell wall projecting from said bottom toward said inner side of said window, said display field being fixed in position relative to said shell,
        iii) fastening rails extending along said longitudinal sides of said display field; and
    le;2qc) an adhesive releasably secures said fastening rails to said inner side of said window so that said front face is parallel to said inner side.

2. The combination of claim 1 further characterized in that:
    le;2qa) said display device includes a frame member releasably connected to said shell; and
    le;2qb) said frame member mates with and holds an edge flange on the display field.

3. The combination of claim 2 further characterized in that:
    le;2qa) said edge flange extends along the longitudinal sides of the display field;
    le;2qb) said frame member being formed by two flat profiles which abut the edge flange on one side thereof; and
    le;2qc) the edge flange being arranged between said flat profiles and respective contact surfaces formed on said shell and being held therebetween so that said cover and said flat profiles are releasably fastened.

4. The combination of claim 3 further characterized in that:
    le;2qa) said edge flange is provided with apertures receiving screws therein which releasably fasten the cover and the flat profiles.

5. The combination of claim 3 further characterized in that:
    le;2qa) at least one fastening rail has a substantially T-shaped cross section, including a cross bar and a leg; and
    le;2qb) said cross bar being fixed to the inner side of the window by means of an adhesive, and said leg being releasably secured to at least one of the display field and the cover.

6. The combination of claim 5 further characterized by and including:
    le;2qa) a masking layer applied to the inner side of the window in the area of the cross bar;
    le;2qb) said masking layer being applied by means of screen printing.

7. The combination of claim 1 further characterized in that:
    le;2qa) the display field comprises a plurality of individual display elements which can be activated individually.

8. The combination of claim 7 further characterized in that:
    le;2qa) each individual display element is an electromagnetically activatable, disc-shaped, rotatably supported and two-colored individual display element; and
    le;2qb) each individual display element has associated therewith a light emitting diode (LED) for illuminating of the individual display element.

9. The combination of claim 8 further characterized by and including:
    le;2qa) a programmable display control;
    le;2qb) said programmable display control being connected to a bus system within the vehicle;
    le;2qc) said programmable display control being arranged within the display device.

* * * * *

UNITED STATES PATENT AND TRADEMARK OFFICE
CERTIFICATE OF CORRECTION

PATENT NO. : 6,282,824 B1  
DATED : September 4, 2001  
INVENTOR(S) : Barbara Noll et al.

Page 1 of 1

It is certified that error appears in the above-identified patent and that said Letters Patent is hereby corrected as shown below:

Column 7,  
Line 65, delete "1e;2qc)" and substitute -- c) -- in its place.

Column 8,  
Line 4, delete "1e;2qa)" and substitute -- a) -- in its place.  
Line 7, delete "1e;2qb)" and substitute -- b) -- in its place.  
Line 11, delete "1e;2qa)" and substitute -- a) -- in its place.  
Line 14, delete "1e;2qb)" and substitute -- b) -- in its place.  
Line 16, delete "1e;2qc)" and substitute -- c) -- in its place.  
Line 23, delete "1e;2qa)" and substitute -- a) -- in its place.  
Line 29, delete "1e;2qa)" and substitute -- a) -- in its place.  
Line 32, delete "1e;2qb)" and substitute -- b) -- in its place.  
Line 38, delete "1e;2qa)" and substitute -- a) -- in its place.  
Line 42, delete "1e;2qb)" and substitute -- b) -- in its place.  
Line 47, delete "1e;2qa)" and substitute -- a) -- in its place.  
Line 51, delete "1e;2qa)" and substitute -- a) -- in its place.  
Line 54, delete "1e;2qb)" and substitute -- b) -- in its place.  
Line 60, delete "1e;2qa)" and substitute -- a) -- in its place.  
Line 61, delete "1e;2qb)" and substitute -- b) -- in its place.  
Line 63, delete "1e;2qc)" and substitute -- c) -- in its place.

Signed and Sealed this

Twenty-eighth Day of May, 2002

*Attest:*

*Attesting Officer*

JAMES E. ROGAN  
*Director of the United States Patent and Trademark Office*